(12) United States Patent
Wendt et al.

(10) Patent No.: US 10,794,420 B2
(45) Date of Patent: Oct. 6, 2020

(54) UNIVERSAL JOINT INCLUDING A SEAL, SEAL, AND METHOD FOR INSTALLING A SEAL

(71) Applicant: Aktiebolaget SKF, Gothenburg (SE)

(72) Inventors: Volker Wendt, Zell (DE); Padelis Katsaros, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 175 days.

(21) Appl. No.: 15/691,926

(22) Filed: Aug. 31, 2017

(65) Prior Publication Data
US 2018/0073556 A1 Mar. 15, 2018

(30) Foreign Application Priority Data
Sep. 12, 2016 (DE) .................. 10 2016 217 296

(51) Int. Cl.
*F16C 21/00* (2006.01)
*F16C 33/78* (2006.01)

(52) U.S. Cl.
CPC ........ *F16C 21/005* (2013.01); *F16C 33/7809* (2013.01)

(58) Field of Classification Search
CPC ............... F16C 21/005; F16C 33/7809; F16C 33/7823; F16C 33/7889; F16C 2208/02; F16C 33/7816; F16J 15/3284; F16J 15/3204; F16D 3/16

USPC ................................... 464/131, 133
See application file for complete search history.

(56) References Cited

U.S. PATENT DOCUMENTS

| | | | | |
|---|---|---|---|---|
| 3,592,022 A * | 7/1971 | Stokely | ............... | F16O 33/7809 464/131 |
| 6,736,731 B2 * | 5/2004 | Schultze | ............. | F16O 33/7809 464/131 |
| 2004/0171427 A1 * | 9/2004 | Wagner | .................. | F16D 3/385 464/131 |

* cited by examiner

*Primary Examiner* — Greg Binda
(74) *Attorney, Agent, or Firm* — J-TEK Law PLLC; Scott T. Wakeman; Mark A. Ussai

(57) ABSTRACT

A universal joint includes a bush, a bearing journal supported in the bush by a bearing and a seal assembly configured to form a seal between the bearing journal and the bush. The seal assembly includes an outer body formed from a first material having a first hardness, and a reinforcing body at least partially embedded in the outer body is formed from a second material having a hardness greater than the hardness of the first material. The reinforcing body contacts and forms a slip surface for a rolling element of the bearing. The reinforcing body and the outer body are configured such that the reinforcing body compresses a portion of the outer body against the journal when the seal assembly is mounted on the bearing journal.

16 Claims, 6 Drawing Sheets

UNIVERSAL JOINT INCLUDING A SEAL, SEAL, AND METHOD FOR INSTALLING A SEAL

CROSS-REFERENCE

This application claims priority to German patent application no. 10 2016 217 296.4 filed on Sep. 12, 2016, the contents of which are fully incorporated herein by reference.

TECHNOLOGICAL FIELD

Exemplary embodiments relate to a universal joint including at least one bearing journal, wherein each bearing journal is supported in a bearing bush by a journal bearing assembly. A seal is disposed for sealing the bearing journal against the bearing bush. Exemplary embodiments also relate to a seal and a method for installing a seal on the universal joint.

BACKGROUND

Conventional seals for universal joints or for universal-joint bushes usually comprise an inner seal and an outer pre-seal. In some cases at least one of the two individual seals is manufactured from a metal-reinforced elastomer. This can lead to a higher material expenditure for manufacturing the seals. In order to reduce a manufacturing expenditure for the seal, there are conventional pre-seals that are manufactured partially one-part from a thermoplastic elastomer. The manufacturing costs or an expenditure in manufacturing can thereby possibly be reduced. However, since the thermoplastic elastomer tends to creep more, under unfavorable circumstances insufficient joint pressure may thereby be generated in a static seal with respect to the bearing journal.

Since under certain circumstances the soft thermoplastic elastomer plastic can only be used with a very low joint pressure in the static seal, with some of these conventional seals an under-rusting of the seal can occur due to the lack of joint pressure. Under unfavorable circumstances water can thereby enter into the journal bearing assembly. This is undesirable.

SUMMARY

There is therefore a need to provide an improved arrangement for sealing universal joints or their bearing bushes. This need is addressed by the universal joint, the seal, and the method according to the present disclosure.

Exemplary embodiments relate to a universal joint including at least one bearing journal, wherein each bearing journal is supported in a bearing bush by a journal bearing assembly, and wherein a seal is disposed for sealing the bearing journal against the bearing bush. The seal comprises a seal portion that sits on the bearing journal in a statically sealing manner. Furthermore, the seal comprises a reinforcing body that is manufactured from a harder material than the seal portion. The reinforcing body also includes a slip surface for a rolling element of the journal bearing assembly. The reinforcing body is configured to position the seal portion with respect to the bearing journal or also with respect to the sleeve. Since the reinforcing body includes a harder material than the seal portion, in some exemplary embodiments a sufficient joint pressure can be achieved on the static seal. A creeping of the seal portion can possibly at least be reduced. Since the reinforcing body also includes the slip surface for the rolling elements, in some exemplary embodiments additional parts that serve as slip surface can be omitted, or damage to the seal material can be avoided.

The entire seal as well as the reinforcing body and the seal portion can be configured annular, for example. The seal portion and the reinforcing body can, for example, be disposed coaxially to each other, wherein the reinforcing body can be disposed radially outside the seal portion if the seal portion is directed radially inward. The reinforcing body can be disposed at least partially overlapping in the axial direction with respect to the seal portion. The seal portion can, for example, abut on the bearing journal in the circumferential direction in an encircling manner. In an installed state of the seal on the universal joint the reinforcing body, which is configured to position the seal portion with respect to the bearing journal and/or the sleeve, can, for example, cause the seal portion, which abuts on the bearing journal in a statically sealing manner, to be pressed against the bearing journal. For example, in the installed state the seal portion can be compressed or reduced in comparison to a non-installed state. For example, in an installed state the volume of the seal portion can be at least 1%, 2%, 5%, 10%, 15%, 20%, 25% smaller than in a non-installed state. In the installed state, for example, a desired sealing of the universal joint can be achieved using the seal. A positioning can cause, for example, an overlap between the seal portion and the bearing journal to be able to be maintained at the required thickness over an entire operating period. The overlap here can be, for example, a plurality of tenths of a millimeter, for example, up to 0.1 mm, 0.2 mm, 0.3 mm, 0.5 mm, 0.6 mm, 0.7 mm, 0.8 mm, 0.9 mm. The required overlap here can be, for example, large enough that a sufficient seal effect is achieved with respect to water penetrating from outside.

A slip surface for a rolling element can be, for example, a surface of the reinforcing body facing the rolling element, against which the rolling element can roll in the axial direction. The journal bearing assembly can comprise a plurality of rolling elements. The rolling elements can be all possible rolling elements, for example, cylindrical roller bearings, tapered roller bearings, cylindrical rollers, needle rollers, balls, tapered rollers, or the like.

In some exemplary embodiments the seal portion can comprise an elastomer as material. Good sealing properties can thereby be achieved, for example. In other exemplary embodiments the seal portion can comprise a thermoplastic elastomer (TPE-U). In some exemplary embodiments, since the seal portion comprises a thermoplastic elastomer or is completely manufactured therefrom, a seal portion having an increased wear resistance can be provided. In other exemplary embodiments further seal lips that comprise the seal that will be described more precisely later can also be manufactured from the thermoplastic elastomer. A manufacturing can then be effected in individual parts that are assembled, or in a 2-component injection-molding method.

Additionally or alternatively the reinforcing body can be manufactured from a plastic. In some exemplary embodiments, since the reinforcing body is manufactured from a plastic, a manufacturing cost, for example, compared to metal-reinforced seals, can be reduced. The plastic of the reinforcing body can be, for example, a fiber-reinforced plastic, for example, including glass fibers, carbon fibers, or the like. The plastic can possibly also include another filler. The plastic can be, for example, a polymer, polyamide (PA), PA6, or the like. Nevertheless in some exemplary embodiments a good stabilizing, a protection against creeping of the elastic seal portion and seal lips, and/or also a wear protection against abrasive media can be made possible.

Additionally or alternatively the seal can include at least one first radially outwardly directed seal lip that slips in a dynamically sealing manner on the bearing bush, or on a sleeve connected to the bearing bush such that it rotates together with the bearing bush. The seal can also include at least one second radially inwardly directed seal lip that slips in a dynamically sealing manner on the bearing bush or on the sleeve. In some exemplary embodiments, since the seal includes two seal lips that abut on the sleeve or bearing bush from outside and inside, a sufficient sealing of the universal joint can be achieved. In some exemplary embodiments the sealing can lead to a lubricating grease being retained in the universal joint in operation and no liquid or dirt being able to penetrate from outside into the universal joint. In some exemplary embodiments, for example, in order to make possible an exchange of the lubricant, at least one of the seal lips can be formed such that the lubricant impinged with pressure can escape between the seal lip and the sleeve. Here a pressure acting on the lubricant in the exchange situation can be higher than a pressure acting on the lubricant in an operating state, for example, by more than a factor of 10, 20, or 30. For example the pressure can lie at approximately 1.5 bar, and during a regreasing in a range between 30 bar and 60 bar.

A seal lip can be, for example, any component that sealingly abuts on the bearing journal and/or the bearing bush, or a sleeve connected to the bearing bush such that it rotates together with the bearing bush. In some exemplary embodiments the seal lip can be manufactured from the same material as the seal portion. In some exemplary embodiments the seal portion, the first seal lip, and the second seal lip can be formed monolithically on a single elastic body. The elastic body can be manufactured, for example, from the thermoplastic elastomer. In some exemplary embodiments, since the seal includes an elastic body that comprises the seal portion and the two seal lips, an installing and a positioning of the individual seal lips with respect to each other is simplified. A monolithically formed body can, for example, be manufactured one-piece or from one casting. For example, the elastic body can be manufactured in a single injection-molding method or, for example, be cut out from a single workpiece.

In some exemplary embodiments the first and the second seal lip are disposed spaced from each other in the axial direction. The spacing can have, for example, at least 5%, 10%, 20%, 30%, 40%, 50%, or 60% of a maximum extension of the seal in the axial direction.

Additionally or alternatively, in some exemplary embodiments the reinforcing body and the elastic body are connected to each other in a materially-bonded manner. In some exemplary embodiments it can thereby be made possible that only one component is to be installed and/or to be positioned as a seal. The seal can be configured, for example, to assume functions that arise from the adjacent regions. In some exemplary embodiments the materially-bonded connection can result from the seal being manufactured by a two-component injection-molding technique (2C injection technique). In other words, the interference-fit connection can result from the reinforcing body first being manufactured and its surface skin then being melted by a temperature of the material of the elastic body with the result that the two bodies connect to each other in a materially-bonded manner. In some exemplary embodiments the materially-bonded connection can be generated in an adhesive-free manner and without use of a third material. In other exemplary embodiments the material connection can also be achieved using an adhesive.

In some exemplary embodiments at least the first and/or the second seal lip can be bent against their manufacturing direction. Since one of the seal lips is bent, in some exemplary embodiments it can be achieved that the seal lip is oriented in a different direction in an installed state than during the manufacturing in the injection-molding mold. Since the elastic body is manufactured as a monolithic component, it is important that all seal lips are oriented in the same direction in the injection-molding mold. Despite a flexibility of the lip material, a seal lip set against the direction of withdrawal or demolding direction of the tool would probably tear off during a demolding. In some exemplary embodiments a reverse orientation of the seal lip against the direction of withdrawal from the mold is now required for a function of a seal lip disposed on the universal-joint bush. Either during the manufacturing or during the installing the seal lip can be everted in a counter-direction to its original orientation. The seal lip can possibly have a film hinge for this purpose. In some exemplary embodiments the seal lip can have a lesser extension in the axial direction in the region of the film hinge than in other regions of the seal lip. Under certain circumstances the seal lip can plastically deform at the film hinge during a bending. For example, the axial extension of the seal lip in the region of the film hinge can be smaller by at least 10%, 20%, 30%, 40%, or 50% than outside the film hinge. Alternatively the bending of the seal lip can also occur without film hinge, plastic deforming, and/or wall-thickness reduction.

Compared to the already described exemplary embodiment, wherein the elastic body including the seal lips and the seal portion is connected to the reinforcing body in a materially-bonded manner, in other exemplary embodiments the reinforcing body and the elastic body can be connected to each other in an interference-fit and/or friction-fit manner. In some exemplary embodiments the interference-fit and/or friction-fit connection between the reinforcing body and the elastic body can only arise in an installed state in the universal joint. In this exemplary embodiment the elastic body can include a recess, which is configured to at least sectionally receive the reinforcing body. The reinforcing body and the elastic body are disposed overlapping in the axial direction. The elastic body can radially outwardly abut on the reinforcing body at least sectionally and also be disposed radially inwardly on the reinforcing body at least sectionally. In some exemplary embodiments a manufacturing method wherein the two components are connected in a materially bonded manner can thereby be omitted.

In exemplary embodiments wherein the reinforcing body and the elastic body are not connected to each other in a materially bonded manner, but rather only in an interference-fit and/or friction-fit manner, the elastic body can include a first radially inwardly directed seal lip that slips in a dynamically sealing manner on the bearing bush, or on a sleeve connected to the bearing bush such that the sleeve rotates together with the bearing bush. This seal lip and the seal portion can be configured, for example, monolithic on a single elastic body. In some exemplary embodiments a sufficiently good sealing can thereby be achieved. Additionally or alternatively the elastic body can include a radially inwardly directed seal lip that abuts on the reinforcing body in a statically sealing manner. For example, for this purpose in some exemplary embodiments an effective connection between the reinforcing body and the seal body can be achieved. Under certain circumstances the seal lip can be oriented such that it is configured to allow a lubricating grease impinged with pressure to pass through for exchange.

The seal lip can possibly simultaneously be in abutment radially inward with the sleeve and the reinforcing body.

In exemplary embodiments wherein the reinforcing body and the elastic body are only connected to each other in an interference-fit and/or friction-fit manner, the reinforcing body can also include a radially outwardly directed seal lip that slips in a dynamically sealing manner on the bearing bush, or a sleeve connected to the bearing bush such that it rotates together with the bearing bush. In some exemplary embodiments a sufficient sealing can thus be achieved. This seal lip can be, for example, the first radially outwardly directed seal lip.

Exemplary embodiments also relate to a seal that is configured to seal a gap between a first component and a second component. The seal comprises at least one seal lip, wherein the seal lip is configured to be oriented in a different direction in an installation situation than during a manufacturing. In some exemplary embodiments the manufacturing of the seal can thereby be simplified. For example, in the installation situation here the seal lip can deviate at least by an angle of 10°, 20°, 25°, 30°, 40°, 45°, 50°, 90°, 100°, 120°, 130°, 140° or 150° from a position of the seal during the manufacturing or in a tool. For example, the seal can comprise a film hinge for this purpose. At the film hinge or another region at which the seal is bent the seal can have a lesser thickness in the direction in which it is bent than outside of the region. Under certain circumstances a bending can thereby be facilitated. Alternatively the seal lip can also have the same thickness continuously in the direction in which it is bent.

Exemplary embodiments also relate to a universal joint including at least one bearing journal, wherein each bearing journal is supported in a bearing bush by a journal bearing assembly and wherein a seal is disposed for sealing of the bearing journal against the bearing bush. For this purpose the seal comprises a seal portion that sits on the bearing journal in a statically sealing manner and a reinforcing body that is manufactured from a harder plastic material than the seal portion. The reinforcing body is also configured to position the seal portion with respect to the bearing journal and/or the sleeve. At least in an installed state the seal portion and the reinforcing body can be connected to each other in an interference-fit and/or friction-fit manner or on the other hand in a materially-bonded manner.

Exemplary embodiments also relate to a method for assembling a seal with a universal joint including at least one bearing journal, wherein each bearing journal is supported in a bearing bush by a journal bearing assembly, with the result that the seal for sealing the bearing body is disposed against the bearing bush. During assembly the seal that is directed in a first direction is everted, with the result that the seal lip is directed in a different direction than the first direction. In some exemplary embodiments the orientation of the seal lip can thereby be adapted. In some exemplary embodiments the everting of the seal lip may not occur only during assembly, but rather as a step in the manufacturing.

Another aspect of the disclosure comprises a universal joint comprising a bush, a bearing journal supported in the bush by a bearing, and a seal assembly configured to form a seal between the bearing journal and the bush. The seal assembly includes an outer body formed from a first material having a first hardness and a reinforcing body at least partially embedded in the outer body and being formed from a second material, such as a plastic, having a hardness greater than the hardness of the first material. The reinforcing body contacts and forms a slip surface for a rolling element of the bearing. Also, the reinforcing body and the outer body are configured such that the reinforcing body compresses a portion of the outer body against the journal when the seal assembly is mounted on the bearing journal.

A further aspect of the disclosure comprises a seal configured to seal a gap between a first component and a second component, the seal including a seal lip, and the seal lip comprising a film hinge.

The exemplary embodiments and their individual features disclosed in the above description, the following claims, and the accompanying Figures can be meaningful and implemented both individually and in any combination for the realization of an exemplary embodiment in its various designs. The Figures thus schematically show the following views.

DETAILED DESCRIPTION

In the following description of the accompanying depictions, identical reference numbers designate identical or comparable components. Furthermore, summarizing reference numbers are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

Figure 1:
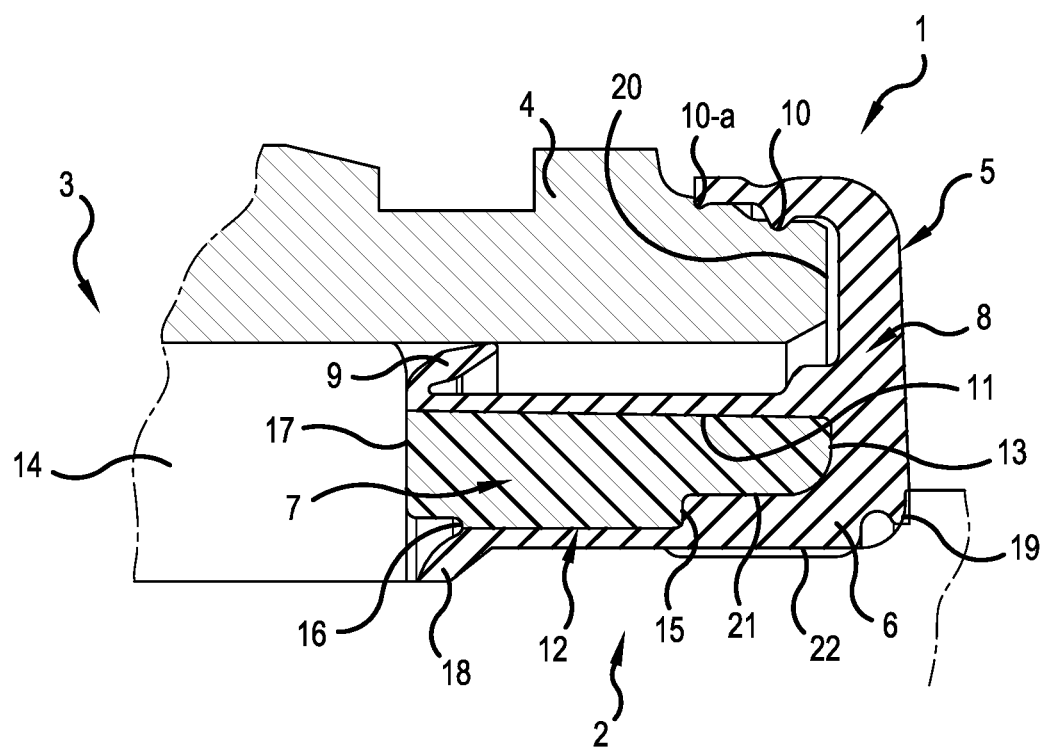
FIG. 1 shows a schematic depiction of a sectional view of a portion of a universal joint including a seal according to an exemplary embodiment.

FIG. 1 shows a schematic depiction of a sectional view of a portion of a universal joint 1 including a seal 5 according to an exemplary embodiment.

The universal joint 1 comprises at least one bearing journal 2, which is supported in a sleeve or bearing bush 4 by a journal bearing assembly 3. A seal 5 is disposed for sealing the bearing journal 2 with respect to the bearing bush 4. The seal 5 comprises a seal portion 6. The seal portion 6 is disposed on the bearing journal 2 in a statically sealing manner. The seal 5 further comprises a reinforcing body 7. The reinforcing body 7 is manufactured from a harder material than the seal portion 6. In addition, in an installed state the reinforcing body 7 is configured to position the seal portion 6 with respect to the bearing journal 2 and/or the sleeve 4, which can also be referred to as the bearing bush.

The journal bearing assembly 3 comprises a rolling element 14. A raceway for the rolling element 14 is respectively provided on the sleeve 4 and on the journal 2. In the exemplary embodiment of FIG. 1 the rolling element 14 is a needle. In a further, not-depicted exemplary embodiment other rolling elements, for example, tapered rollers, cylindrical rollers, balls, or the like can also be used. The sleeve and/or the journal can include a raceway for the rolling element. Alternatively raceway elements can also be inserted into the sleeve or on the journal.

In the exemplary embodiment of FIG. 1 the seal portion 6 is part of an elastic body 8. The elastic body 8 is manufactured from a thermoplastic elastomer, a vulcanized elastomer, fluorocarbon rubber (FKM), hydrogenated acrylonitrile butadiene rubber (HNBR), nitrile rubber (NBR), or the like. In addition to the seal portion 6 the elastic body 8 comprises a first seal lip 9 and a second seal lip 10. Here the first seal lip 9 is directed radially outward and is in contact with a radially inwardly directed surface of the sleeve 4 in a dynamically sealing manner. The second seal lip 10 is directed radially inward and is in contact with a radially outwardly directed surface of the seal sleeve 4 in a dynamically sealing manner; the surface can also be referred to as the outer side of the journal cross. The second seal lip 10 is disposed overlapping in the axial direction with respect to an axial extension of the seal portion 6. The first seal 9 is disposed axially outside the seal lip 10 and axially outside the seal portion 6. A further, third seal lip 10-a is disposed upstream in the axial direction of the second seal lip 10. The seal lip 10-a is also directed radially inward and abuts on a radially outwardly directed surface of the seal sleeve 4. The seal lip 10 lies between the end side 20 of the bearing bush 4 and the seal lip 10-a in the axial direction. The seal lip 10-a lies on a larger diameter portion of the bearing bush 4 than the seal lip 10. The sleeve or bush 4 also has different diameters at the regions on which the seal lips 10 and 10-a abut. In some further, not-depicted exemplary embodiments the seal lips can also be disposed on the same diameter. Optionally also only one seal lip can be provided.

The elastic body 8 is configured monolithic. Here the elastic body 8 is configured such that it completely covers a radially outwardly directed surface 11 of the annular reinforcing body 7 in the axial direction, at least radially outside the reinforcing body 7. A radially inwardly directed surface 12 of the reinforcing body 7 is also in large part, and at least in a region wherein the reinforcing body 7 could otherwise be in contact with the bearing journal 2, encased by the material of the elastic body 8. The material of the elastic body 8 is also disposed on an end side 13 of the reinforcing body 7 facing away from the journal bearing assembly 3.

The reinforcing body 7 or its radially outwardly directed surface 11 has the same radius along its entire axial extension. In a section of the reinforcing body 7 that overlaps axially with the seal portion 6, the radially inwardly directed surface 12 is disposed on a larger diameter than in the axial direction adjacent to the region. A shoulder 15 thereby results on the reinforcing body 7. A further shoulder 16 is located on a side of the shoulder 15 facing the rolling element 14. The shoulder 16 results from the fact that on a side facing the shoulder 15 the radially inwardly directed surface 12 is again disposed on a larger radius.

The reinforcing body 7 includes a slip surface 17 for the rolling element 14. In the exemplary embodiment of FIG. 1 the material of the elastic body 8 is disposed flush with the slip surface 17 in the axial direction on an end edge of the seal 5, which comprises the slip surface 17. The slip surface 17 is thus surrounded radially outwardly by the elastic body 8. In other words, the slip surface has a smaller extension in the radial direction than the rolling element. In some further, not-depicted exemplary embodiments the elastomer material of the elastic body can also be offset with respect to the slip surface such that the rolling element 14 actually only slips on the slip surface 17. Optionally the slip surface can also have an extension in the radial direction that corresponds at least to a radial extension of the rolling element. The slip surface here can be disposed at a radial height such that it completely overlaps with the rolling element in the radial direction. On the radially inwardly directed surface 12 the reinforcing body 7, directly adjacent to the slip surface 16 the reinforcing body 7 is free of the elastic body.

In addition to the already described seal lips 9 and 10 the elastic body 8 includes a further seal lip 18. This is configured to abut on the bearing journal 2 in a statically sealing manner axially inside the seal portion 6. In the axial direction outside the seal portion 7 the elastic body 8 comprises a further seal lip 19 statically abutting on the bearing journal 2 in the axial direction. In a region that lies between the seal lip 18 and the seal portion 6 in the axial direction the elastic body 8 and also the reinforcing body are spaced in the radial direction with respect to the bearing journal 2. Here the seal portion 6 has a length in the axial direction that corresponds to at least 30%, 40%, or 50% and not more than 80% or 70% of a maximum axial extension of the seal 5. In some further, not-depicted exemplary embodiments the seal can also be shorter, with the result that the seal portion has an axial extension that corresponds to at least 60%, 70%, or 80% of a maximum axial extension of the seal. In some further, not-depicted exemplary embodiments the seal lips 19 and 18 can be omitted under certain circumstances.

The elastic body 8, which can also be referred to as the seal body, and the reinforcing body 7 are connected to each other in a materially-bonded manner. For example, this can occur during the manufacturing of the seal 5 in a two-component injection-molding method, which can also be referred to as a 2C injection technique. The reinforcing body 7 and the elastic body 8 can include, for example, a materially-bonded connection on all surfaces at which they are in contact with each other. In some exemplary embodiments the reinforcing body 7 and the elastic body 8 can include a materially-bonded connection on at least more than 50%, more than 60%, more than 70%, more than 80%, or more than 90% of the surfaces at which they are in contact with each other.

The seal body 8 abuts on the radially inwardly directed surface of the sleeve 4 in a dynamically sealing manner only with the seal lip 9. The rest of the elastic body 8 is completely spaced radially inwardly from the sleeve 4. A contact region has an extension in the axial direction of at most 2%, 5%, 7%, 10%, or 15% of a maximum axial extension of the seal 5. The elastic body 8 is spaced in the axial direction with respect to an end side 20 that is facing in the axial direction.

In some exemplary embodiments functions of two separate seals conventionally used in universal joints can be integrated by the seal 5 into a single common seal. In addition, since the reinforcing body 7 includes the slip surface 17, the function of a slip disc can also be integrated into the seal 5. In some exemplary embodiments the elastic body 8 can include a thermoplastic elastomer as seal material or be manufactured therefrom. In some exemplary embodiments a seal function can thereby be improved.

In some exemplary embodiments the seal 5 is manufactured in a two-component method and comprises a hard plastic material, for example, as the reinforcing body 7 having a high wear resistance, and a soft plastic as the elastic body 8, which has a sufficient flexibility for the seal lips and seal portions. In some exemplary embodiments the reinforcing body, which can also be referred to as the hard component, can be optimized for its task via fillers, such as, for example, fibers, glass fibers, carbon fibers, plastic, or the like.

Since the reinforcing section 7 overlaps in the axial direction with the seal portion 6 at least sectionally, for example, over a region of more than 50%, 60%, 70%, 80%, 90% of an axial extension of the seal portion 6, in some exemplary embodiments the soft seal portion 6, which can also be referred to as the soft plastic component, can be prevented from creeping. This can be possible, for example, since the reinforcing body 7 stabilizes the seal portion 6. In addition, since the reinforcing body 7 is disposed radially outside the seal portion 6 overlapping in the axial direction with respect to the seal portion 6, in some exemplary embodiments a joint contact pressure of the seal portion 6 on the bearing journal 2 is increased. In some exemplary embodiments the seal portion 6 can thereby be sufficiently compressed to obtain a sufficient seal effect.

The region of the reinforcing body 7 that can be in contact with an adjacently moving part, for example, a roller end side of the rolling element 14, namely the slip surface 17, can be embodied as a hard plastic component resistant to wear.

Figure 2:
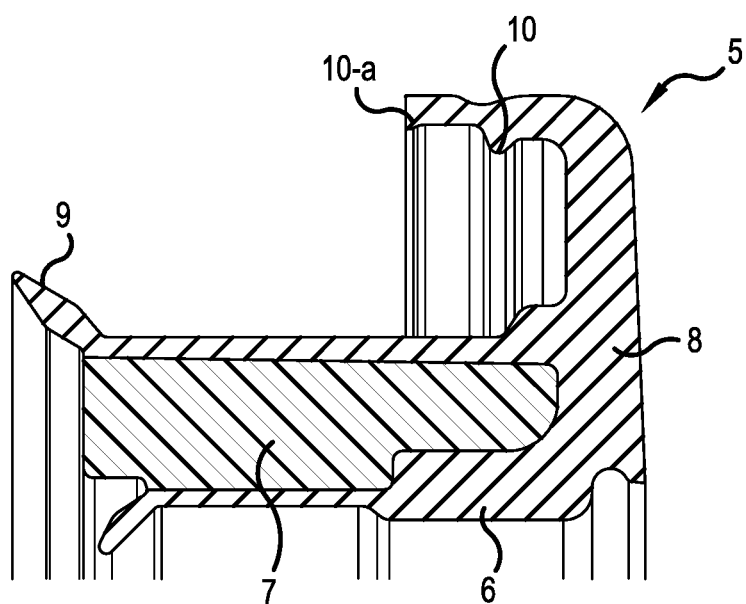
FIG. 2 shows a schematic depiction of a sectional view of a seal for a universal joint according to an exemplary embodiment.

FIG. 2 shows a schematic depiction of a sectional view of the seal 5 for the universal joint 1 or also another universal joint according to an exemplary embodiment. Here the first seal lip 9 is located in a first position. Here it is a position wherein the seal lip is manufactured, for example, in an injection-molding method.

In some manufacturing methods a manufacturability of the seal geometry can require that the seal lip is disposed in a withdrawal direction of the shaping tool-component. This can even be the case if it allows comparatively large undercuts as a soft component. In some exemplary embodiments, despite a flexibility of the lip material a seal lip set against the direction of withdrawal of the tool can tear off during a demolding. Since two seal lips 9 and 10 are provided in the seal 5, they must essentially have a similar orientation during the manufacturing. For the function of the seal lip 9 disposed farther in the interior of the universal-joint bush a reverse orientation of the seal lip 9 against the direction of withdrawal can now be necessary. In order to orient the seal lip 9 according to the application purpose, in some exemplary embodiments the seal lip 9 can be everted in a process step subsequent to the injection molding. The everting can possibly also only occur during installation.

Figure 3:
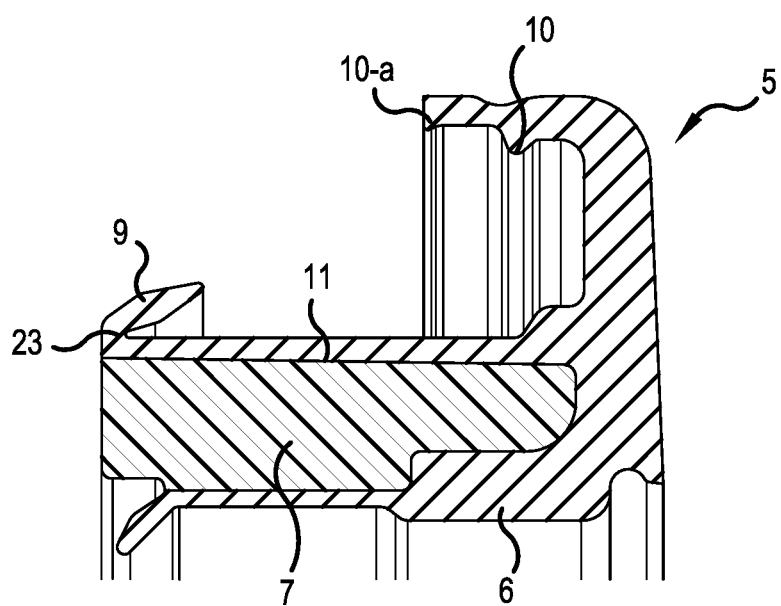
FIG. 3 shows a schematic depiction of a sectional view of the seal of FIG. 2 according to a further processing step.

FIG. 3 shows the seal 5, wherein the seal lip 9 is already everted and is oriented in a different direction than in the situation according to the demolding in FIG. 2. Here the seal lip 9 is angled over a schematically depicted film hinge 23 by more than 50°, 60°, 70°, 80° or 90° with respect to the original direction, with the result that an angular distance to a radially outwardly directed surface 11 of the reinforcing body 7 becomes smaller. In other words, in some exemplary embodiments there is the possibility to evert the soft seal lip oriented in the direction of withdrawal of the tool in a counter-direction in a further process step. In some exemplary embodiments it can thereby be made possible that a seal is manufacturable that fulfills necessary functions from adjacent regions due to its two-component structure. In addition, a savings of complexity or costs can result.

Figure 4:
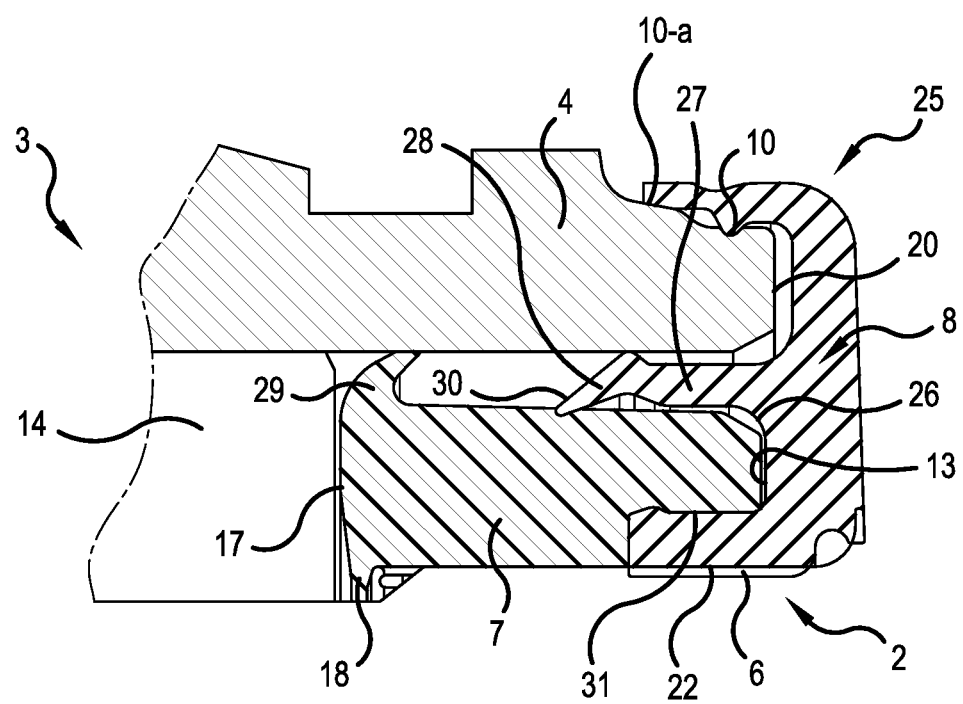
FIG. 4 shows a schematic depiction of a sectional view of a portion of a universal joint including a seal according to a further exemplary embodiment.

FIG. 4 shows a schematic depiction of a sectional view of a section of a universal joint 1 including a seal 25 according to a further exemplary embodiment. The universal joint 1 of FIG. 4 differs from the universal joint of FIG. 1 in that in the seal 25 the elastic body 8 and the reinforcing body 7 are not connected to each other in a materially bonded manner, but rather only in a friction-fit and/or interference-fit manner Identical and/or similar elements are therefore designated with identical reference numbers.

As in the above-described exemplary embodiment the elastic body 8 of the seal 25 comprises the seal portion 6 as well as the seal lip 10. Furthermore the elastic body 8 comprises a recess 26. The recess 26 overlaps at least sectionally with the seal portion 6 in the axial direction. The recess 26 is disposed encircling in the circumferential direction and serves at least for partial receiving of the reinforcing body 7. The recess 26 is located outside the seal portion 6 in the radial direction and is axially outwardly delimited by the elastic body 8 or its material. The recess 26 is radially outwardly delimited by an elastomer section 27 of the elastic body 8. A radial extension of the recess 26 approximately corresponds to a radial extension of the region of the reinforcing body 7 that is disposed in the recess 26.

The elastomer section 27 or the seal body 8 includes a radially inwardly directed seal lip 28. The seal lip 28 is configured to abut radially inwardly on the reinforcing body 7 in a statically sealing manner. The seal lip 28 also abuts in a dynamically sealing manner on the radially inwardly directed surface of the sleeve 4. Furthermore, the seal lip 28 has the shape of a hand. When used grease is pressed axially outward from the journal bearing assembly 3, it can slip on an oblique surface 30 of the seal lip 28. Then the seal lip 28 is pressed radially inward. The grease can then flow radially outside the elastomer section 27 past the end side 20 and over the seal lip 10 and leave the universal joint 1. In some further, not depicted exemplary embodiments the seal lip 28 can have a different shape and/or be omitted.

The reinforcing body 7 is configured essentially similar to the reinforcing body 7 of the preceding exemplary embodiment, but comprises a seal lip 29 that is directed radially outward and is disposed on the radially inwardly directed surface of the sleeve 4 in a dynamically sealing manner. In some exemplary embodiments the seal lip 29 can also be disposed without covering or only with a sectional covering in the circumferential direction with respect to the sleeve 4. Channels or passages can then possibly be provided in order to make possible a through-greasing. The seal lip 29 here is also manufactured from the plastic material of the reinforcing body 7. In the exemplary embodiment of FIG. 4 the reinforcing body 7 also comprises the seal lip 18 that abuts on the bearing journal 2. Here in this case the seal lip 18 is manufactured from the harder material or plastic of the reinforcing body 7. In some exemplary embodiments this can be omitted. The slip surface 17 of the reinforcing body 7 is not disposed as a flat surface as in the exemplary embodiment of FIG. 1, but rather has a convex shape, wherein a radially inner lying region projects farther radially toward the rolling element 14 than an edge region of the slip surface 17.

Up to the seal lip 18 the reinforcing body 7 is spaced in the radial direction from the bearing journal 2 by a gap. Here the seal lip 18 has at most a contact region having an axial extension of less than 10% or 5% of the maximum axial extension of the seal 25. The end side 13 of the reinforcing body 7 is spaced in the axial direction from the elastic body 8. In some exemplary embodiments these two surfaces can also be in contact with each other.

In some exemplary embodiments, in the installed state, the soft seal material of the elastic body 8 is positioned separately over the reinforcing body 7 in the region of the static seal portion 6. An inner surface 31 of the reinforcing body 7, which presses on the seal portion 6, has a smaller spacing here to the radially outwardly directed surface 22 of the bearing journal than a radial extension of the seal portion 6 in an uninstalled state.

In some exemplary embodiments if the elastic body 8 or the seal body is manufactured from a thermoplastic elastomer the problem of the low joint pressure in the static sealing of the seal portion 6 can thereby be solved. In some exemplary embodiments a corrosion, which can arise due to leakage or the so-called under-rusting, can thereby be prevented.

In other words, in some exemplary embodiments a static seal seat of the soft plastic components of the elastomer body can be prevented from creeping by the annular hard component or the reinforcing body. The hard component can be even better adapted to this task via a filler, for example, fibers or glass fibers. The slip surface 17, which can be in contact with the adjacently moving parts, for example, the roller end sides of the rolling element 14, is also designed well against wear as a hard plastic component. In some exemplary embodiments it can thus be made possible that further additional functions can be fulfilled via the plastic component, which previously had to be achieved expensively via individual parts and/or more expensive surrounding components and their installation.

In some exemplary embodiments a seal can thus be manufactured that fulfills the functions from the adjacent regions due to the construction from two specialized components and additionally can make possible a desired cost savings.

Figure 5:
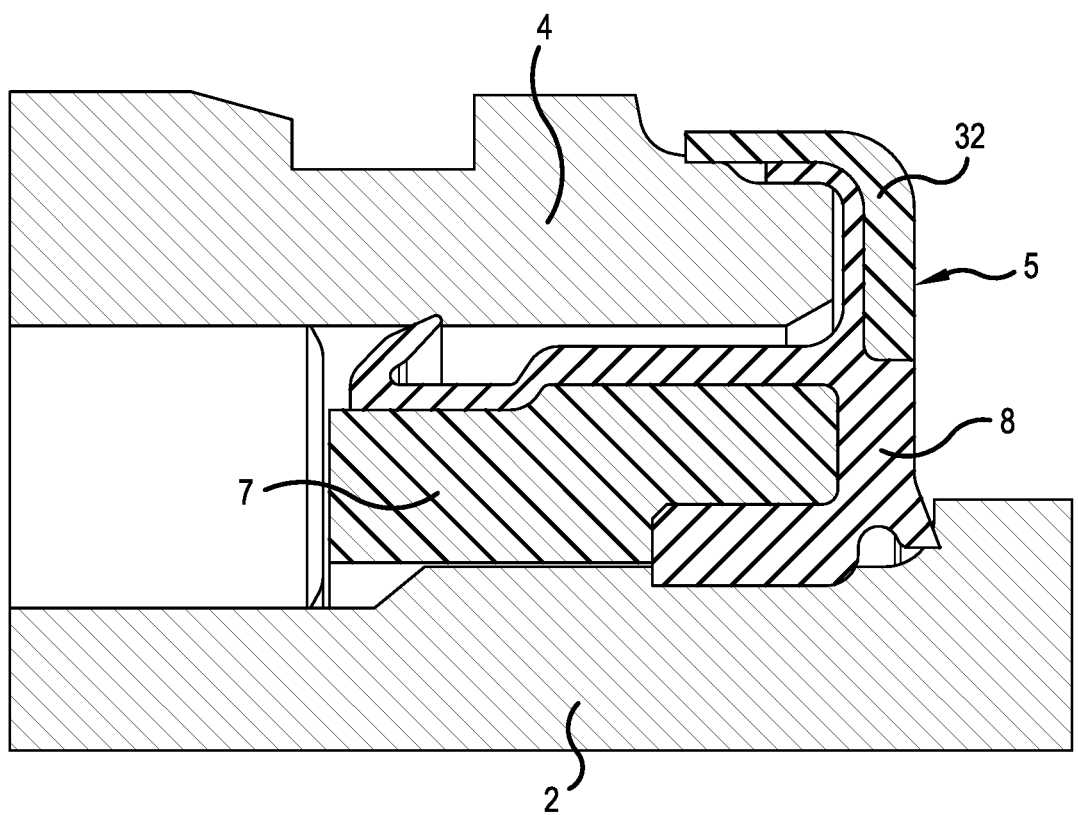
FIG. 5 shows a schematic depiction of sectional view of a portion of a universal joint including a seal according to a further alternative exemplary embodiment.
Figure 6:
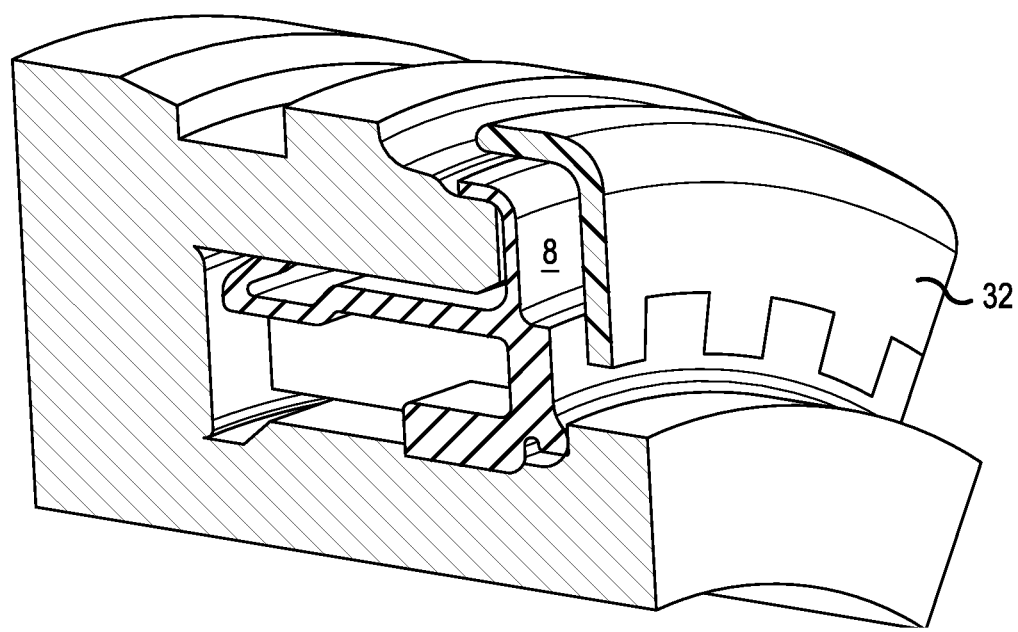
FIG. 6 shows a schematic depiction of a sectional view of a portion of the universal joint including the seal according to the exemplary embodiment according to FIG. 5.

FIGS. 5 and 6 show a schematic depiction of a section of a portion of a universal joint including a seal 5 according to a further alternative exemplary embodiment. The seal 5 differs as described in the following from the seal 5 of the exemplary embodiment of a seal 5 shown in FIG. 1. The seal 5 of the exemplary embodiment of FIGS. 5 and 6 includes an elastic body 8 to whose outer side an armoring 32 is attached. The armoring can be comprised of polyamide 66, which can be reinforced by glass fibers. The armoring completely covers a region of the elastic body 8 that abuts on the bearing bush 4 and effectively protects it against damaging influences. The elastic body 8 and the armoring 32 can be manufactured together in a 2-component technique. The armoring 32 is configured annular and surrounds the bearing journal 2. In the embodiment according to FIGS. 5 and 6 the elastic body does not include the seal lip 18 and the seal lip 10-a. However, the armoring 32 abuts on the bearing bush 4.

The exemplary embodiments and their individual features disclosed in the above description, the following claims, and the accompanying Figures can be meaningful and implemented both individually and in any combination for the realization of an exemplary embodiment in its various designs. In some further exemplary embodiments, features that are disclosed in other exemplary embodiments as device features can also be implemented as method features. Furthermore, features that are implemented in some exemplary embodiments as method features can also optionally be implemented in other exemplary embodiments as device features.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved universal joint.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Universal joint
2 Bearing journal
3 Journal bearing assembly
4 Bearing bush
5 Seal
6 Seal portion
7 Reinforcing body
8 Elastic body
9 First seal lip
10 Second seal lip
10-a Third seal lip
11 Radially outwardly directed surface
12 Radially inwardly directed surface of the reinforcing body
13 End side
14 Rolling element
15 Shoulder
16 Shoulder
17 Slip surface
18 Seal lip
19 Seal lip
20 End side
21 Radially inwardly directed surface
22 Radially outwardly directed surface of the bearing journal
23 Film hinge
25 Seal
26 Recess
27 Elastomer section
28 Seal lip
29 Seal lip
30 Plane
31 Radially inwardly directed surface of the reinforcing body

What is claimed is:

1. A universal joint comprising:
a bush;
a bearing journal supported in the bush by a bearing; and
a seal assembly configured to form a seal between the bearing journal and the bush, the seal assembly comprising an outer body formed from a first material having a first hardness and a reinforcing body at least partially embedded in the outer body and formed from a plastic having a hardness greater than the hardness of the first material, wherein the reinforcing body and the seal portion are connected to each other in a friction-fit and/or interference-fit manner or in a materially-bonded manner, and wherein a first portion of the outer body is located directly radially between the reinforcing body and the journal and a second portion of the outer body is located radially inward of the bush and directly radially between the reinforcing body and the bush.

2. The universal joint according to claim 1, wherein the reinforcing body and the outer body are configured such that the reinforcing body compresses a portion of the outer body against the journal when the seal assembly is mounted on the bearing journal.

3. The universal joint according to claim 2, wherein the reinforcing body contacts and forms a slip surface for a rolling element of the bearing.

4. The universal joint according to claim 1, wherein the reinforcing body contacts and forms a slip surface for a rolling element of the bearing.

5. A universal joint comprising:
a bush;
a bearing journal supported in the bush by a bearing; and
a seal assembly configured to form a seal between the bearing journal and the bush, the seal assembly comprising an outer body formed from a first material having a first hardness and a reinforcing body at least partially embedded in the outer body and formed from a second material having a hardness greater than the hardness of the first material, the reinforcing body contacting and forming a slip surface for a rolling element of the bearing, wherein the reinforcing body and the outer body are configured such that the reinforcing body compresses a portion of the outer body against the journal when the seal assembly is mounted on the bearing journal, and wherein a first portion of the outer body is located directly radially between the reinforcing body and the journal and a second portion of the outer body is located radially inward of the bush and directly radially between the reinforcing body and the bush.

6. The universal joint according to claim 5, wherein the seal portion comprises an elastomer and/or the reinforcing body is manufactured from a plastic.

7. The universal joint according to claim 5, wherein the seal further includes a first radially outwardly directed seal lip configured to slip in a dynamically sealing manner on the bush, or on a sleeve connected to the bush, and at least one second radially inwardly directed seal lip that slips in a dynamically sealing manner on the bush or on the sleeve.

8. The universal joint according to claim 7, wherein the outer body, the first seal lip, and the at least one second seal lip are monolithically formed on a single elastic body.

9. The universal joint according to claim 7, wherein the first seal lip is shiftable from a first configuration to a second configuration.

10. The universal joint according to claim 7,
wherein the first seal lip is connected to the outer body by a film hinge.

11. The universal joint according to claim 5, wherein the reinforcing body and the outer body are connected to each other in a materially bonded manner.

12. The universal joint according to claim 5, wherein the reinforcing body and the outer body are connected to each other in an interference-fit and/or a friction-fit manner.

13. The universal joint according to claim 12, wherein the seal assembly includes a first radially inwardly directed seal lip that slips in a dynamically sealing manner on the bush or a sleeve connected to the bush, and wherein the seal lip and the outer body are monolithically formed on a single elastic body.

14. The universal joint according to claim 13, wherein the elastic body includes a radially inwardly directed seal lip that abuts on the reinforcing body in a statically sealing manner.

15. The universal joint according to claim 5,
wherein the seal portion comprises an elastomer and/or the reinforcing body is manufactured from a plastic, wherein the seal further includes a first radially outwardly directed seal lip configured to slip in a dynamically sealing manner on the bush, or on a sleeve connected to the bush, and at least one second radially inwardly directed seal lip that slips in a dynamically sealing manner on the bush or on the sleeve, wherein the outer body, the first seal lip, and the at least one second seal lip are monolithically formed on a single elastic body, wherein the reinforcing body and the outer body are connected to each other in a materially bonded manner, and wherein the first seal lip is shiftable from a first configuration to a second configuration.

16. The universal joint according to claim 5, wherein the second material comprises a plastic.

* * * * *